United States Patent
Kim

(10) Patent No.: US 6,674,535 B1
(45) Date of Patent: Jan. 6, 2004

(54) TECHNIQUE FOR PROCESSING PRINT DATA

(75) Inventor: Sung-Jae Kim, Seongnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/885,996

(22) Filed: Jun. 30, 1997

(30) Foreign Application Priority Data

Jun. 30, 1996 (KR) .............................................. 96-26958

(51) Int. Cl.[7] .............................. G06F 3/12; G06F 13/00
(52) U.S. Cl. ...................................... 358/1.15; 358/1.13
(58) Field of Search ................................ 395/114, 112, 395/200, 325, 501, 401, 101, 113, 109

(56) References Cited

U.S. PATENT DOCUMENTS

| 5,031,115 | A |   | 7/1991 | Hayashi |   |
|---|---|---|---|---|---|
| 5,228,118 | A |   | 7/1993 | Sasaki |   |
| 5,293,466 | A |   | 3/1994 | Bringmann |   |
| 5,402,527 | A |   | 3/1995 | Bigby et al. |   |
| 5,467,432 | A |   | 11/1995 | Ota |   |
| 5,481,742 | A |   | 1/1996 | Worley et al. |   |
| 5,497,450 | A |   | 3/1996 | Helmbold et al. |   |
| 5,511,149 | A |   | 4/1996 | Hayano |   |
| 5,555,435 | A |   | 9/1996 | Campbell et al. |   |
| 5,604,843 | A |   | 2/1997 | Shaw et al. |   |
| 5,625,757 | A | * | 4/1997 | Kageyama et al. | 395/113 |
| 5,633,992 | A |   | 5/1997 | Gyllenskog |   |
| 5,778,253 | A | * | 7/1998 | Blair et al. | 395/888 |
| 5,805,777 | A | * | 9/1998 | Kuchta | 395/112 |

* cited by examiner

Primary Examiner—Gabriel Garcia
Assistant Examiner—Douglas Quang Tran
(74) Attorney, Agent, or Firm—Robert E. Bushnell, Esq.

(57) ABSTRACT

A technique for processing print data in which a single printer driver of a host confirms a data processing form of a printer, generates print data corresponding to the confirmed data processing form of the printer and transmits the print data to the printer.

6 Claims, 3 Drawing Sheets

TECHNIQUE FOR PROCESSING PRINT DATA

CLAIM OF PRIORITY

This application makes reference to, incorporates the same herein, and claims all benefits accruing under 35 U.S.C. §119 from an application for METHOD FOR PROCESSING PRINT DATA earlier filed in the Korean Industrial Property Office on Jun. 30, 1996 and there duly assigned Serial No. 26958/1996, a copy of which application is annexed hereto.

BACKGROUND OF THE INVENTION

1. Field of the Invention

The present invention relates to a technique for printing an image by transmitting print data to a printer from a host and, more particularly, to a technique for processing the print data.

2. Description of the Related Art

Generally, a printer is connected to a host such as a personal computer for its use. The host causes the printer to print a print document by using a printer driver which is equipment software. The printer driver converts data of a document file to be printed into a printer control language which is suitable for each printer, such as PCL (Printer Control Language), PDL (Page Description Language), etc., and transmits the printer control language to the printer as print data. Such a printer driver is provided by each printer manufacturer. The printer converts the print data transmitted from the host into a print image such as a bit map image by interpreting or emulation operation, and prints out an image according to the print image on a recording medium by a print engine.

Generally, the printer includes a memory and a central processing unit (CPU) for controlling print operation and processing the print data. The CPU has various kinds of data processing forms, such as a byte form, a word form, a long word form, etc., which are different forms for storing the data in the memory. In the data processing forms of two-byte data, there are a high order type and a low order type. That is, if two bytes are connected, there is a form in which a high order is assigned to a upper address and a form in which a low order is assigned to the upper address. Hence, a CPU manufacturer appends a description for the used form according to a model of the CPU.

Consequently, the host should transmit the print data to the printer according to the characteristic of the CPU of each printer model. In other words, since the printer driver depends on the CPU of each printer, it varies according to the printer model. For this reason, the printer manufacturers have provided a printer driver suitable for the characteristics of the CPU utilized in each printer model. Therefore, even if the printers provide the same emulation mode and the printer manufacturers are the same, only the printer driver suitable for the printer model can be used. If it is desired that the user uses a new printer of the same manufacturer instead of an existing printer, the printer driver suitable for the new printer must again be installed in the host.

As described above, since the printer driver depends on the characteristics of the CPU of the printer, a different printer driver must be used for each printer model. This imposes burden on both the user and the manufacturer. That is, the user must install the printer driver with respect to each printer model and the printer manufacturer has maintenance difficulties.

The Sasaki and Hayashi patents, U.S. Pat. Nos. 5,228,118 and 5,031,115, respectively entitled Printing System Wherein One of Printer Drivers Through Which Print Data Is Sent From A Data Processor To A Printer Is Selected Based On Interpreters Available On The Printer, and Printer Interface Using Printer Response To Determine Printer Type, disclose computer/printer arrangements in which the computer senses a signal to the printer and on the basis of the return signal from the printer determines the proper printer driver.

However, neither Hayashi nor Sasaki teaches or suggests the specifically recited technique for processing print data of the present invention.

The following additional patents each disclose features in common with the present invention but are not deemed to be as pertinent as the Hayashi and Sasaki patents discussed above: U.S. Pat. No. 5,633,992 to Gyllenskog, entitled Low-Level direct Connect For PCL Printers, U.S. Pat. No. 5,511,149 to Hayano, entitled Printer Emulator Capable Of Emulating A Plurality Of Printers Which Operate In Different Modes, U.S. Pat. No. 5,604,843 to Shaw et al., entitled Method And System For Interfacing With A computer Output Device, U.S. Pat. No. 5,402,527 to Bigby et al., entitled Apparatus And Method For Determining The Page Description Language In Which A Print Job Is Written, U.S. Pat. No. 5,467,432 to Ota, entitled Printer Controller Capable Of Operating With Different Operation Modes Based On Mode-Determinative Codes Stored In Point-Table Memory, U.S. Pat. No. 5,481,742 to Worley et al., entitled Printer Control Apparatus For Remotely Modifying Local Printer By Configuration Signals From Remote Host To Produce Customized Printing Control Codes, U.S. Pat. No. 5,497,450 to Helmbold et al., entitled Universal Controller Interface For Barcode Printers, U.S. Pat. No. 5,555,435 to Campbell et al., entitled Automatic Language Boundary Identification For A Peripheral Unit That Supports Multiple Control Languages, and U.S. Pat. No. 5,293,466 to Bringmann, entitled Method And Apparatus For Selecting Interpreter For Printer Command Language Based Upon Sample Of Print Job Transmitted To Printer.

SUMMARY OF THE INVENTION

It is an object of the present invention to provide a print data processing technique which can share a printer driver by printers of various models.

It is another object of the present invention to provide a print data processing technique which can share a printer driver suitable for an emulation by printers having different data processing forms.

In accordance with one aspect of the present invention, a printer driver of a host confirms a data processing form of a printer, generates print data corresponding to the confirmed data processing form of the printer and transmits the print data to the printer.

These and other objects, features and advantages of the present invention will be further described and more readily apparent from a review of the following detailed description of the preferred embodiment when taken in conjunction with the accompanying drawings. In the following description and drawings, numerous specific details such as processing flows are set forth to provide a more thorough understanding of the present invention. It will be apparent, however, to one skilled in the art, that the present invention may be practiced without these specific details. In other instances, well known features and constructions have not been described so as not to obscure the present invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
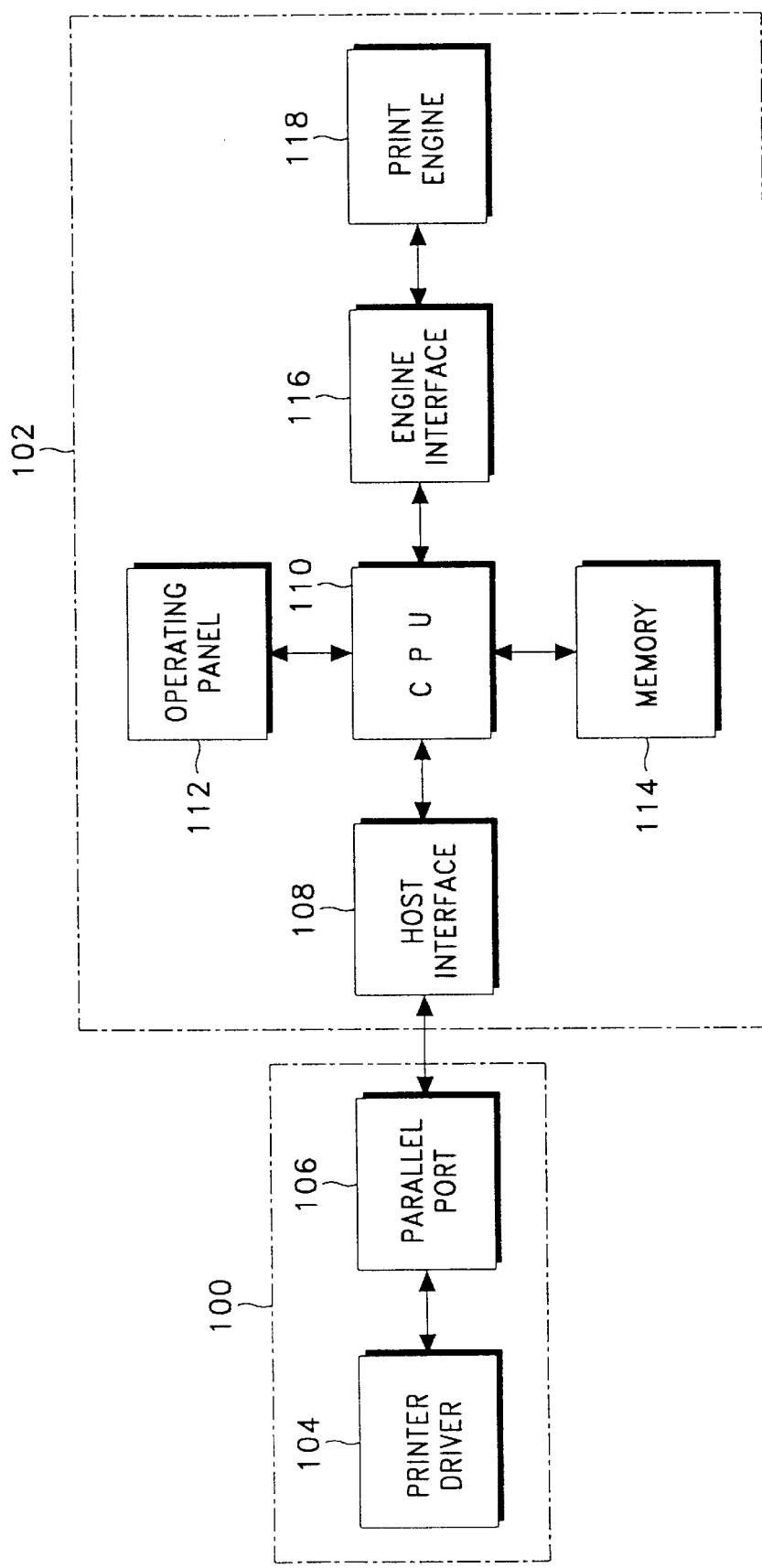
FIG. 1 is a block diagram of a printing system.

Referring to FIG. 1, there is shown a printing system for carrying out bidirectional communication between a host 100 and a printer 102. In the host 100, only a printer driver 104 and a parallel port 106 which are a software block related to the present invention in a personal computer are shown. The parallel port 106 provides the bidirectional communication between the printer driver 104 and the printer 102. The printer 102 connected to the host 100 includes a host interface 108, a CPU 110, an operating panel 112, a memory 114, an engine interface 116 and a print engine 118. The host interface 108 provides the bidirectional communication between the host 100 and the CPU 110. The CPU 110 communicates with the host 100 and implements various functions including printing by controlling the print engine 118 according to various commands received from the printer driver 104 of the host 100 and the operating panel 112. The operating panel 112 has a plurality of keys for receiving the various commands and a display unit for displaying information according to an operation of the printer 102. The memory 114 includes a ROM (Read Only Memory) and a RAM (Random Access Memory) and temporarily stores an execution program of the CPU 110 and data generated by the processing of the CPU 110. The engine interface 116 connected between the CPU 110 and the print engine 118 interfaces an input/output signal. The print engine 118 including mechanical equipment for conveying paper and for printing an image performs the printing operation by the control of the CPU 110.

The above printing system confirms a data processing form of the printer 102. For this, the printer driver 104 of the host 100 and the CPU 110 of the printer 102 carry out functions shown in FIGS. 2 and 3, respectively.

Figure 2:
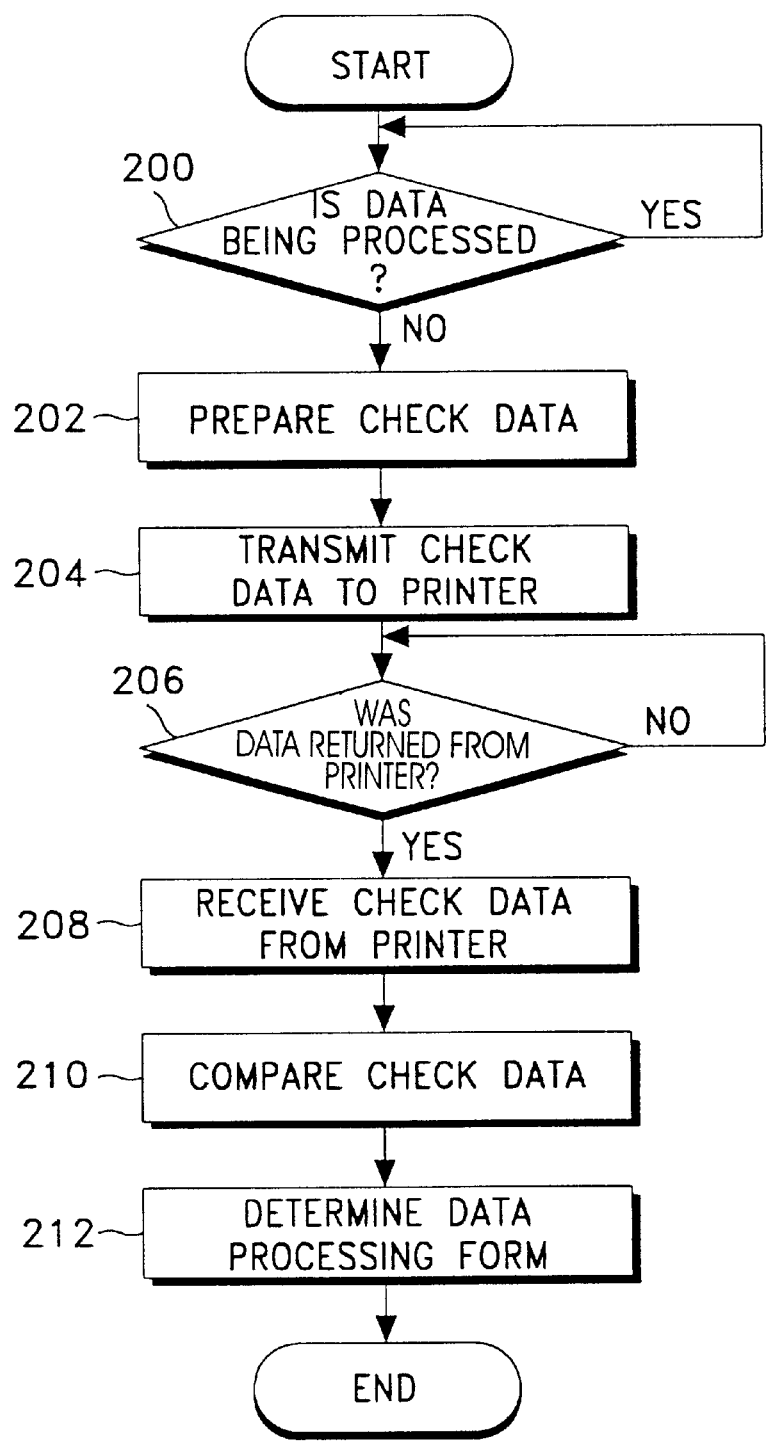
FIG. 2 is a flowchart showing a processing procedure of a host according to the present invention.
Figure 3:
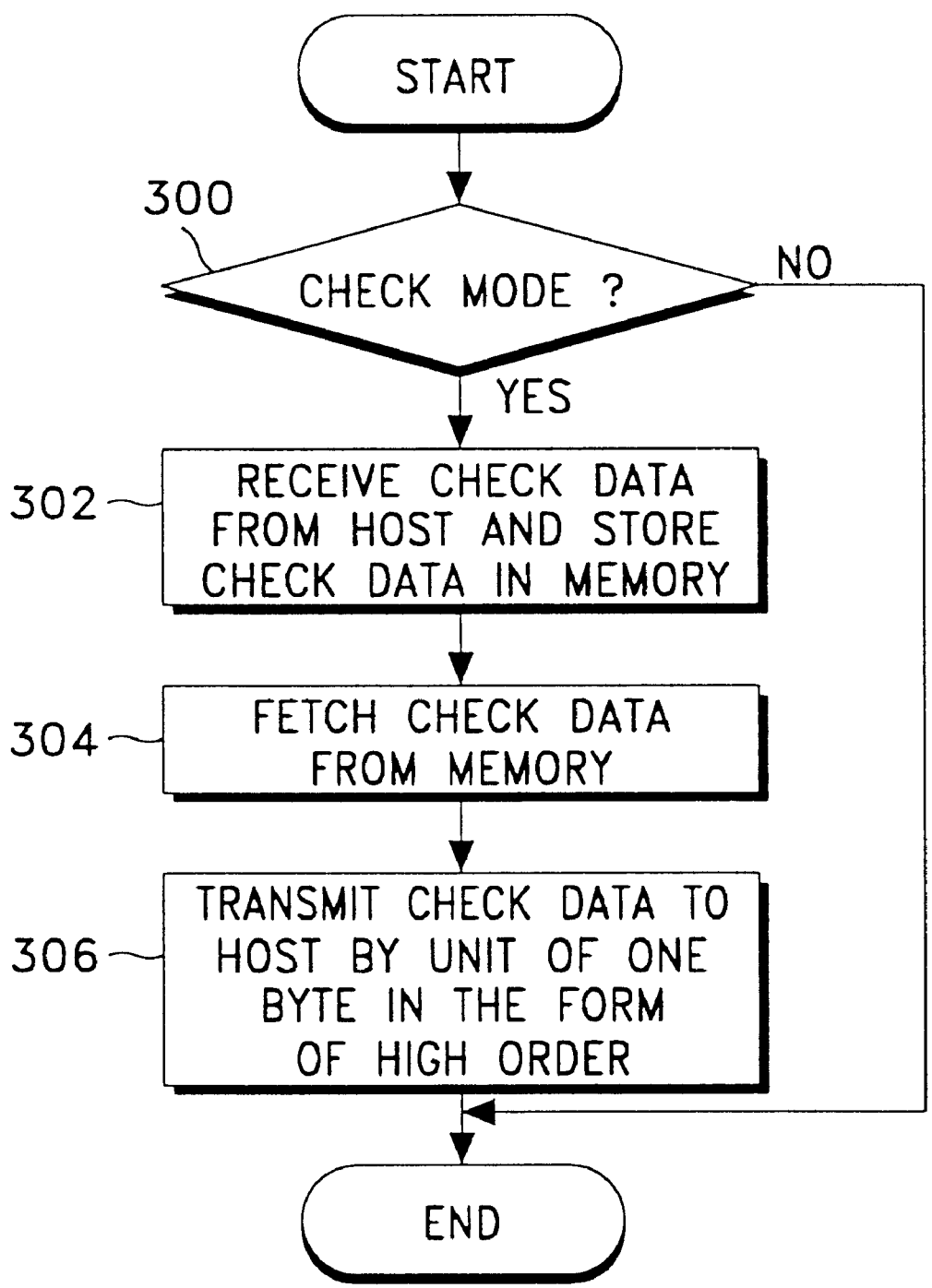
FIG. 3 is a flowchart showing a processing procedure of a printer according to the present invention.

FIG. 2 illustrates a processing procedure of the printer driver 104 of the host 100, and FIG. 3 illustrates a processing procedure of the CPU 110 of the printer 102.

If there is a print request from an application program of the host 100, the printer driver 104 checks, at step 200, whether the host 100 is processing data. If not, the printer driver 104 prepares, at step 202, form values corresponding to data processing forms of the printer 102 as check data. Arbitrary values, for example, "A", "0X3424" and "0X1234568" corresponding respectively to one byte value, one word value and one long word value are prepared as the check data. The printer driver 104 transmits, at step 204, the check data to the printer 102 through the parallel port 106. The printer driver 104 judges, at step 206, whether data has returned from the printer 102.

Then the CPU 110 of the printer 102 receives the check data transmitted from the host 100 in response to a check mode and stores the check data in the memory 114 at steps 300 and 302. In this case, the CPU 110 stores the check data transmitted from the host 100 in the memory 114 without any conversion. Namely, if the received check data is one byte, one byte data is stored, if it is one word, one word data is stored, and if it is one long word, one long word data is stored. The CPU 110 fetches, at step 304, the check data from the memory 114, and transmits, at step 306, the check data to the host 100 by a unit of one byte in the form of high order.

Then the printer driver 104 receives, at step 208, the check data transmitted from the printer 102. The printer driver 104 compares, at step 210, the check data received from the printer 102 with the check data transmitted to the printer 102. The printer driver 104 determines, at step 212, the data processing form of the printer 102. At this time, the printer driver 104 classifies the check data received from the printer 102 in the form of high order and confirms whether the check data received from the printer 102 is identical to the check data transmitted to the printer 102. If the received check data is identical to the transmitted check data, the data processing form of the printer 102 is determined as the high order type which is the same as the check data. If the transmitted check data is different from the received check data, for example, if data of "0X2434" returns while the check data of "0X03424" is transmitted, the data processing form of the printer is determined as the low order type.

Therefore, the check data transmitted to the printer 102 from the printer driver 104 is stored in the memory 114 and again fetched. The fetched data is compared with the check data received to the printer driver 104 to confirm the data processing form of the printer 102.

Thereafter, the printer driver 104 converts a document to be printed into a corresponding data processing form of the printer 102 to generate print data and transmits the print data to the printer 102 to perform a typical printing process. Hence, even if the data processing form of the CPU of the printer is different, the printer driver can be shared.

As described previously, one printer driver can support printers of various models. Therefore, the user need not have and install the printer driver for each printer model, and the printer manufacturer simplifies maintenance.

Although one particular embodiment of the invention has been described, various modifications will undoubtedly apparent to those skilled in the art. For example, the data processing forms are not limited to examples illustrated hereinabove, and addition or alternation is possible. Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of processing print data of a printing system having a host and a printer which are connected to each other by a bidirectional communication interface, said method comprising the steps of:

storing a single print driver in said host;
(a) transmitting form values corresponding to data processing forms of said printer to said printer as check data each time a print request occurs;
(b) receiving said check data and storing said check data in a memory in the printer, and fetching said check data and transmitting said check data to said host;

(c) confirming the data processing form of said printer by comparing the check data received from said printer with the check data transmitted to said printer one by one; and (d) converting a document to be printed into the confirmed data processing form of said printer to generate print data and transmitting the print data to said printer;

said steps (a), (c) and (d) being performed by said single printer driver of said host and said step (b) being performed by said printer.

2. A method of processing print data as set forth in claim 1, said step (b) storing the check data received from said host in said memory without any conversion and again fetching the check data and transmitting the check data to said host by a unit of one byte in the form of high order.

3. A method of processing print data as set forth in claim 2, said step (c) classifying the check data received from said printer in the form of high order and comparing the check data received from said printer with the check data transmitted to said printer one by one.

4. A method of processing print data as set forth in claim 3, said data processing forms comprising a byte form, a word form and a long word form.

5. A method of processing print data as set forth in claim 4, said step (c) determining the data processing form to be a high order type which is the same as the check data if the check data transmitted to said printer is identical to the check data received from said printer.

6. A method of processing print data as set forth in claim 5, said step (c) determining the data processing form to be a low order type if the check data transmitted to said printer is different from the check data received from said printer.

* * * * *